(12) United States Patent
Ianev et al.

(10) Patent No.: US 11,463,978 B2
(45) Date of Patent: Oct. 4, 2022

(54) NETWORK DATA ANALYTICS FUNCTION, ACCESS AND MOBILITY FUNCTION, AND CONTROL METHOD FOR UE ANALYTICS ASSISTANCE FOR NETWORK AUTOMATION AND OPTIMISATION

(71) Applicant: NEC Corporation, Tokyo (JP)

(72) Inventors: Iskren Ianev, Lower Earley (GB); Toshiyuki Tamura, Tokyo (JP); Linghang Fan, Woking (GB); Hassan Al-Kanani, Iver (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/277,054

(22) PCT Filed: Sep. 20, 2019

(86) PCT No.: PCT/JP2019/036963
§ 371 (c)(1),
(2) Date: Mar. 17, 2021

(87) PCT Pub. No.: WO2020/066890
PCT Pub. Date: Apr. 2, 2020

(65) Prior Publication Data
US 2022/0039046 A1    Feb. 3, 2022

(30) Foreign Application Priority Data
Sep. 26, 2018 (EP) .................................. 18197014

(51) Int. Cl.
*H04W 4/00*     (2018.01)
*H04W 60/00*    (2009.01)
*H04W 36/00*    (2009.01)
*H04W 24/02*    (2009.01)
*H04W 24/08*    (2009.01)

(52) U.S. Cl.
CPC ........... *H04W 60/00* (2013.01); *H04W 24/02* (2013.01); *H04W 24/08* (2013.01); *H04W 36/0094* (2013.01); *H04W 36/00837* (2018.08)

(58) Field of Classification Search
None
See application file for complete search history.

(56) References Cited

U.S. PATENT DOCUMENTS 9,826,446 B2 * 11/2017 Venkatraman ...... H04W 52/244

OTHER PUBLICATIONS

International Search Report for PCT Application No. PCT/JP2019/036963, dated Dec. 3, 2019.
Written opinion for PCT Application No. PCT/JP2019/036963, dated Dec. 3, 2019.
3GPP TR 21.905: V15.0.0 (Mar. 2018), 3rd Generation Partnership Project, Technical Specification Group Services and System Aspects, "Vocabulary for 3GPP Specifications", (Release 15), pp. 1-64.

(Continued)

*Primary Examiner* — Suhail Khan
(74) *Attorney, Agent, or Firm* — Sughrue Mion, PLLC

(57) ABSTRACT

A Network Data Analytics Function, NWDAF, includes: means for receiving analytics information regarding cell re-selection by User Equipment, UE, among cells; and means for notifying another network node of matching the analytics information with an exception so that the other network node takes actions for solving the exception.

16 Claims, 9 Drawing Sheets

(56) References Cited

OTHER PUBLICATIONS

3GPP TS 23.501: V15.2.0 (Jun. 2018), 3rd Generation Partnership Project, Technical Specification Group Services and System, Aspects, "System Architecture for the 5G System", Stage 2 (Release 15). pp. 1-216.

3GPP TS 23.502: V15.2.0 (Jun. 2018), 3rd Generation Partnership Project, Technical Specification Group Services and System Aspects, "Procedures for the 5G System", Stage 2 (Reiease 15). pp. 1-308.

3GPP TS 24.501: V15.0.0 (Jun. 2018), 3rd Generation Partnership Project, Technical Specification Group Core Network and Terminals, "Non-Access-Stratum (NAS) protocol for 5G System (5GS)". Stage 3 (Release 15), pp. 1-337.

3GPP TR 23.791: V1.0.0 (Sep. 2018), 3rd Generation Partnership Project, Technical Specification Group Services and System Aspects, "Study of Enablers for Network Automation for 5G", (Release 16), pp. 1-66.

5GAA WG2. "LS on Requirements to enable Predictive QoS for Automotive industry",SA WG2 Meeting #S2-129, S2-1810010, Oct. 15-19, 2018, Dongguan, P. R. China; SA WG2 Meeting, S2-128BIS, S2-188359, Aug. 20-24, 2018, Sophia Antipolis, France, 5GAA Working Group 2 Meeting, A-180265, 7th WG Paris Meeting, Jul. 9-11, 2018.

China Mobile et al., "TS 23.288 Performance Improvement and Supervision of general mode for mioT Terminals", 3GPP TSG-SA WG2 Meeting #130, S2-1900504, Jan. 21-25, 2019, Kochi, India.

China Mobile, "Further clarification on Solution 8" ,SA WG2 Meeting #128bis, S2-188509, Aug. 20-24, 2018,Sophia Antipolis, France.

Lenovo et al., "New Key Issue: UE driven analytics sharing", SA WG2 Meeting #128, S2-186921, Jul. 2-6, 2018, Vilnius, Lithuania.

NEC, "eNA KI-13 Solution 16—Updates to resolve Editor's Note" SA WG2 Meeting #129, S2-1810152, Oct. 21-25, 2018, Dongguan, P. R. China.

\* cited by examiner

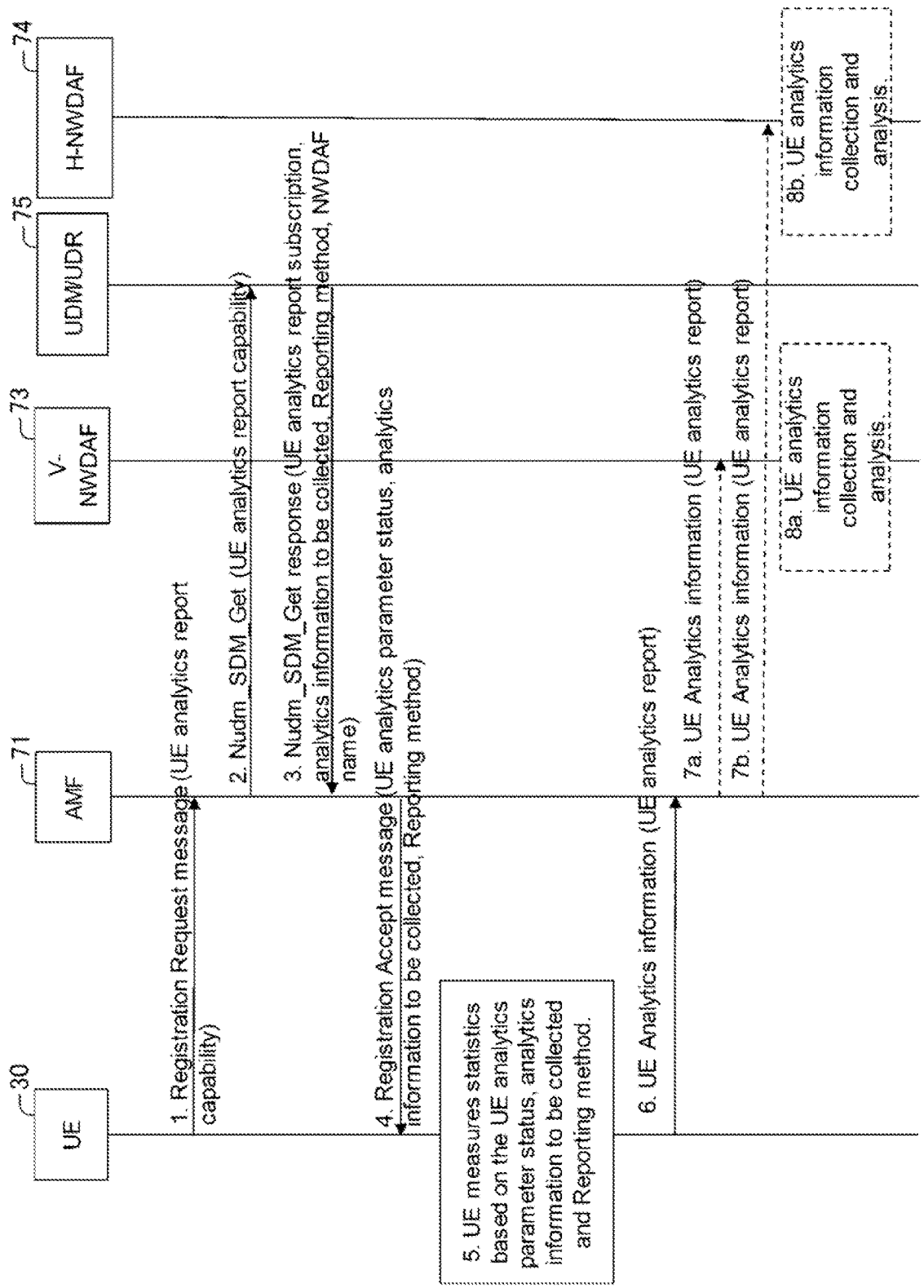
Figure 1: UE analytics information collection procedure (variant 1)

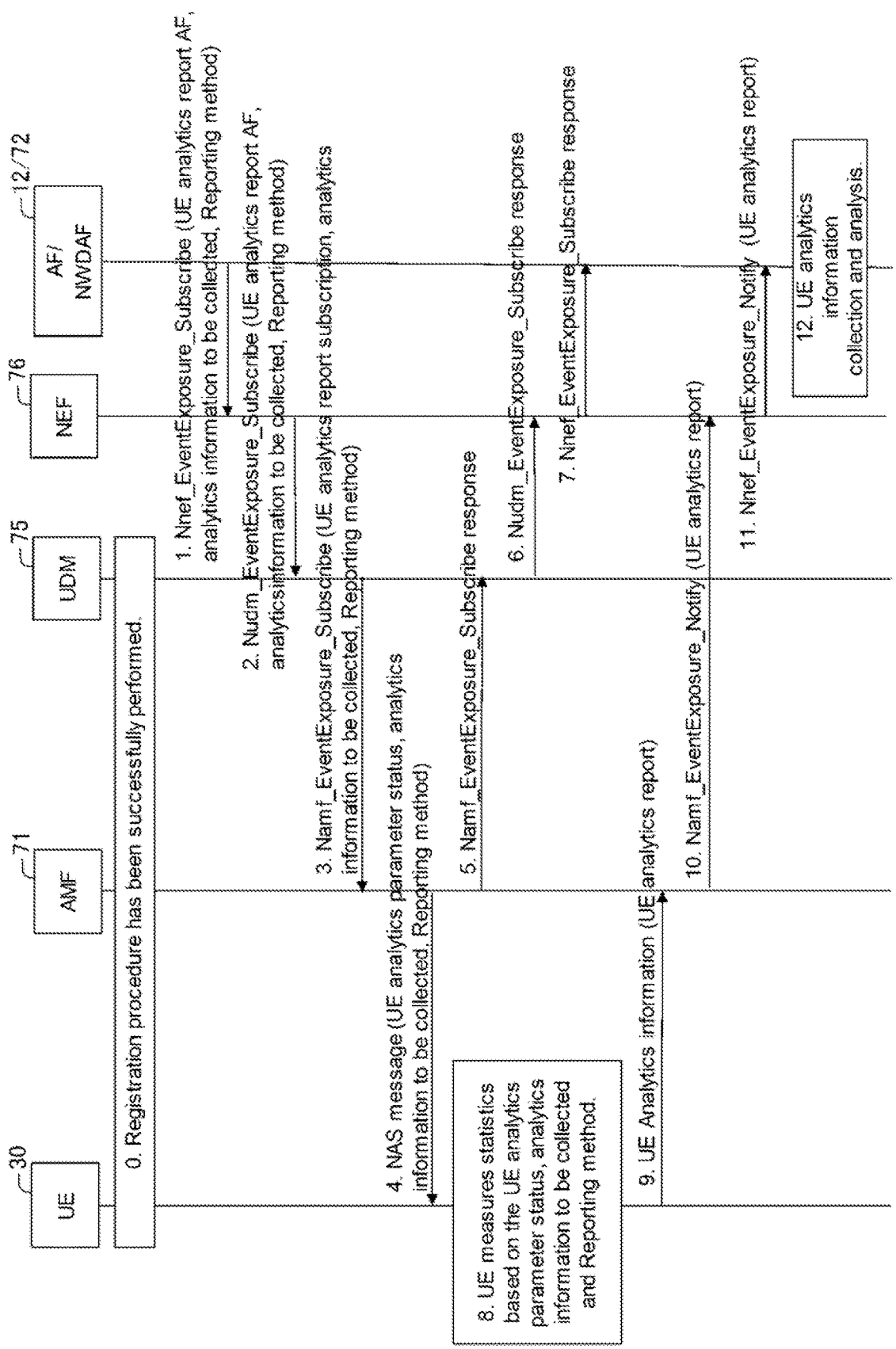
Figure 2: UE analytics information collection procedure (variant 2)

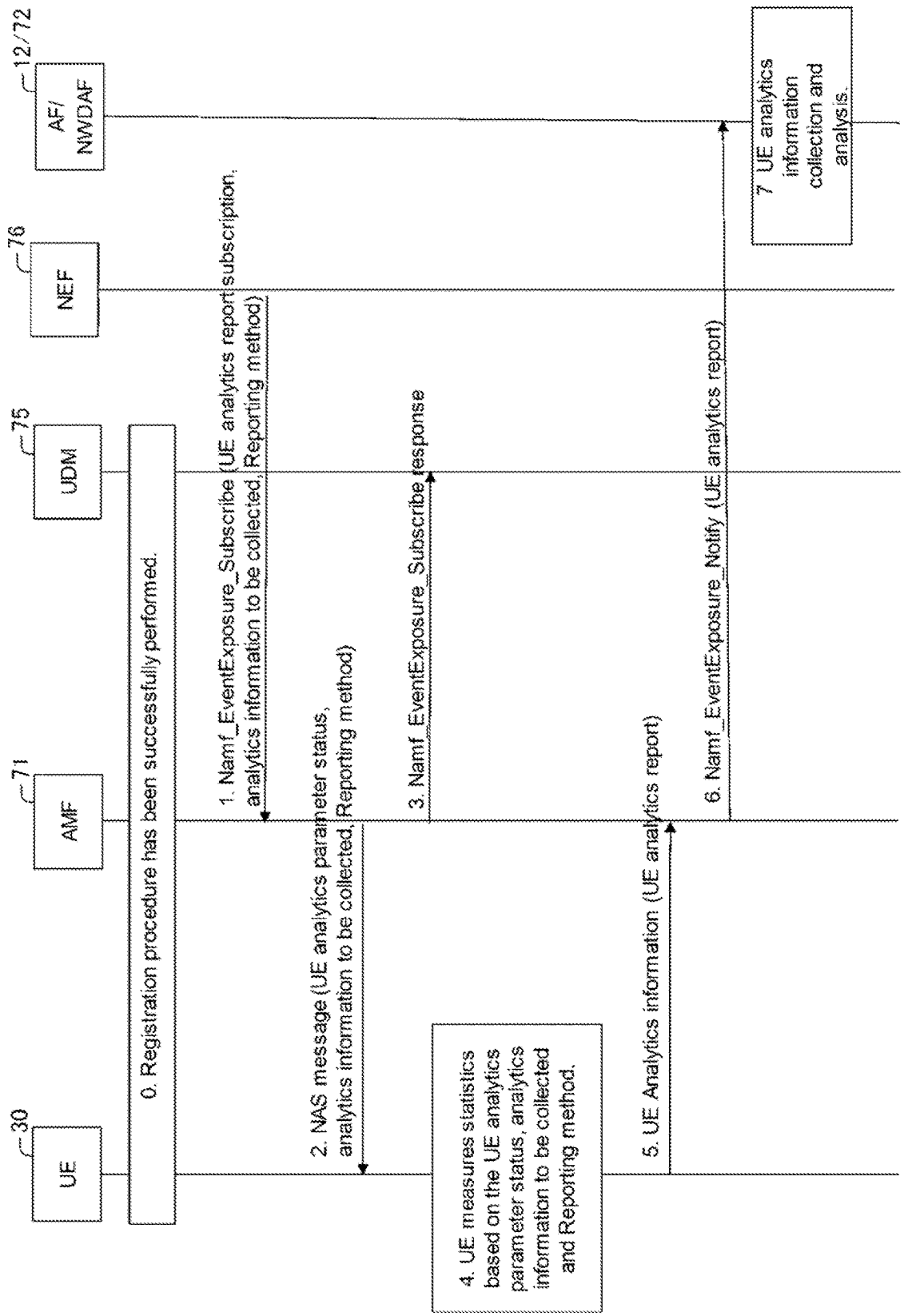
Figure 3: UE analytics information collection procedure (variant 3)

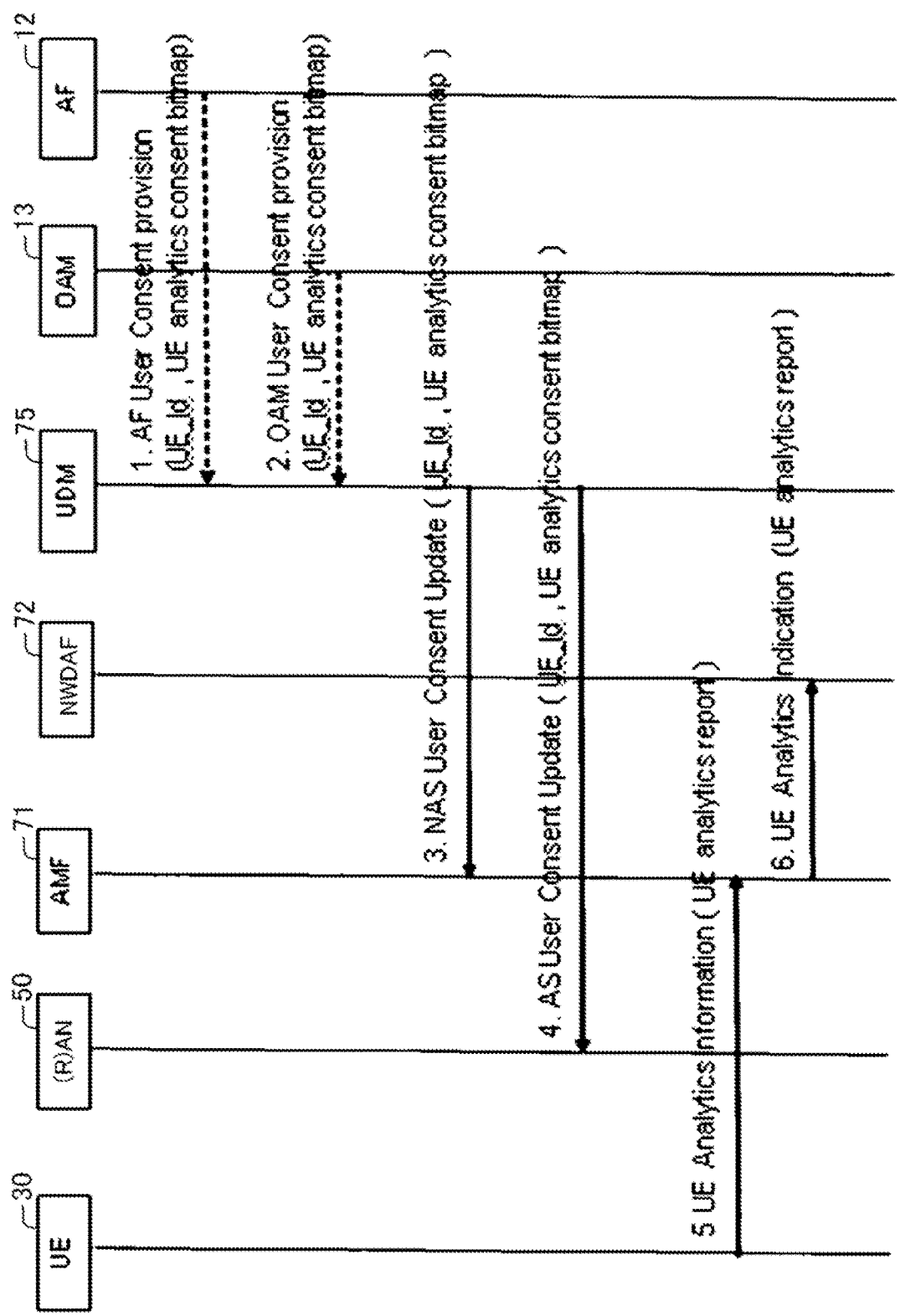
Figure 4 – User Consent provision for UE analytics data

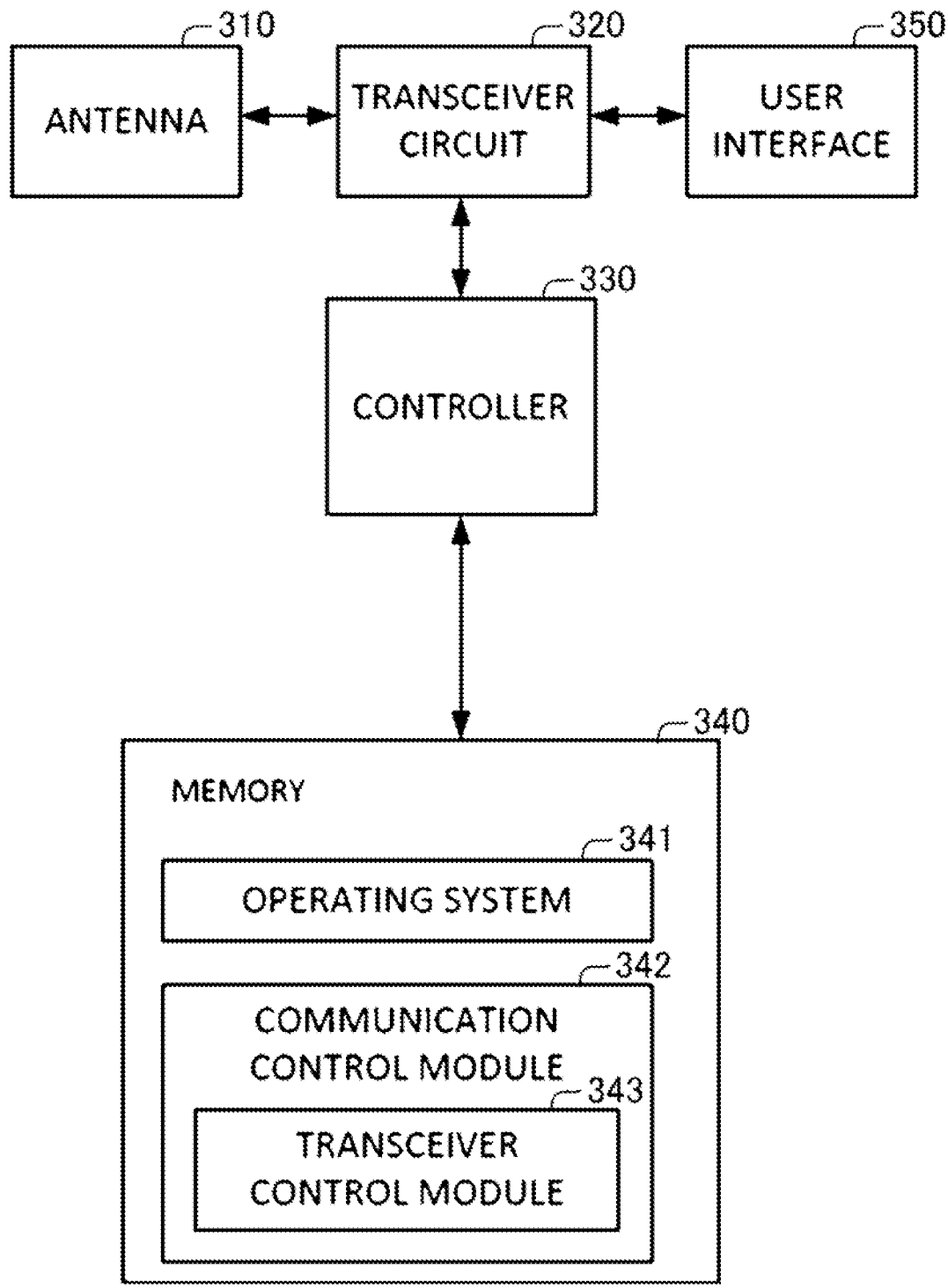
Figure 5: General block diagram for UE 30

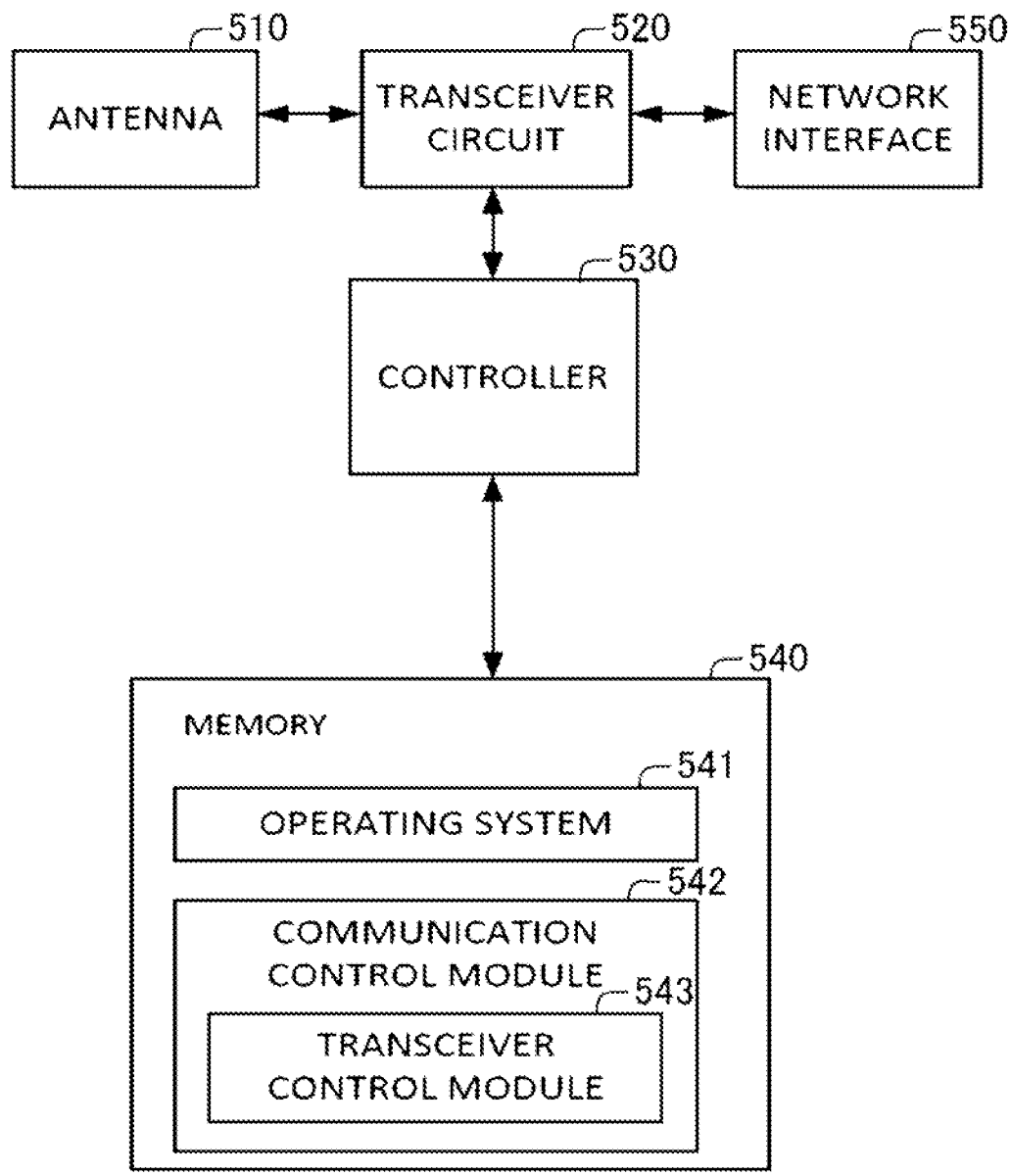
Figure 6: General block diagram for (R)AN 50

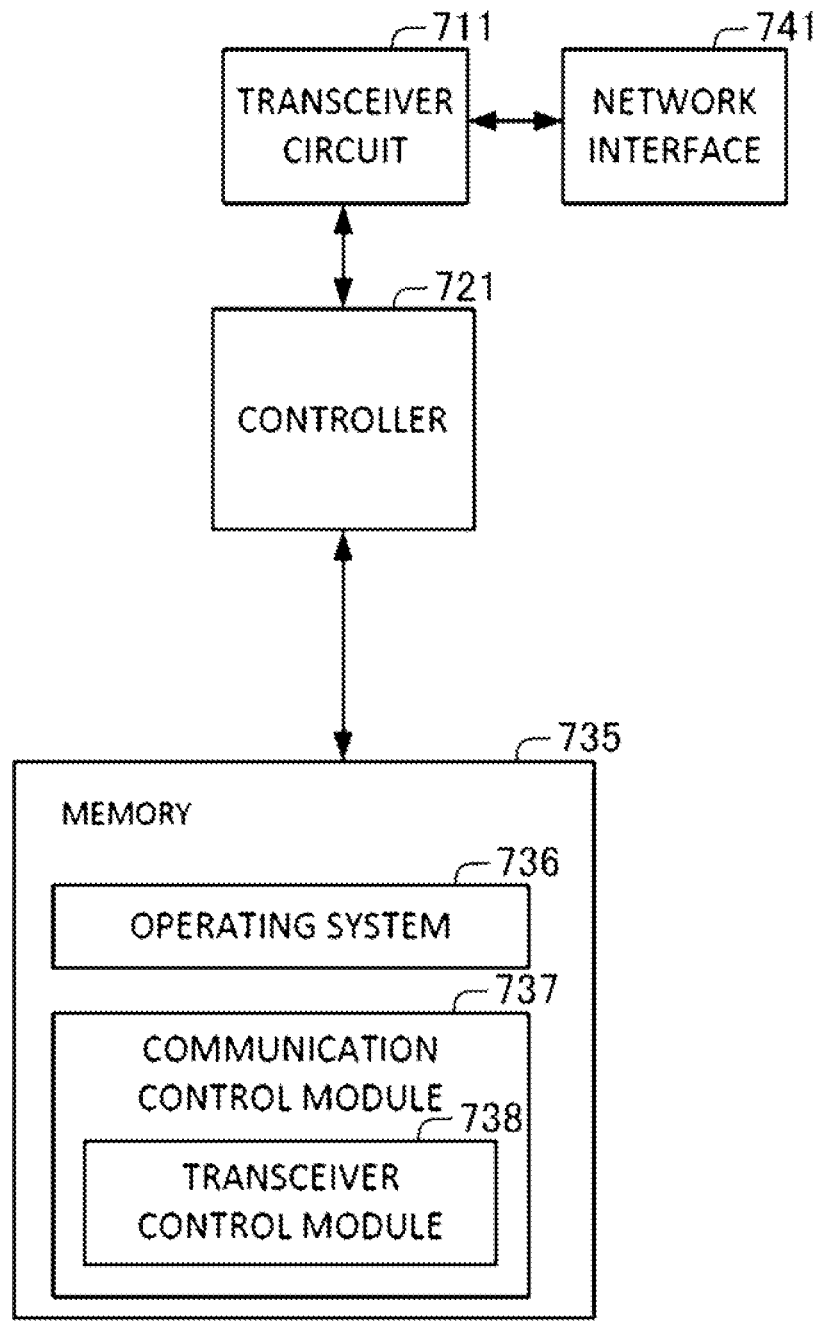
Figure 7: General block diagram for AMF 71

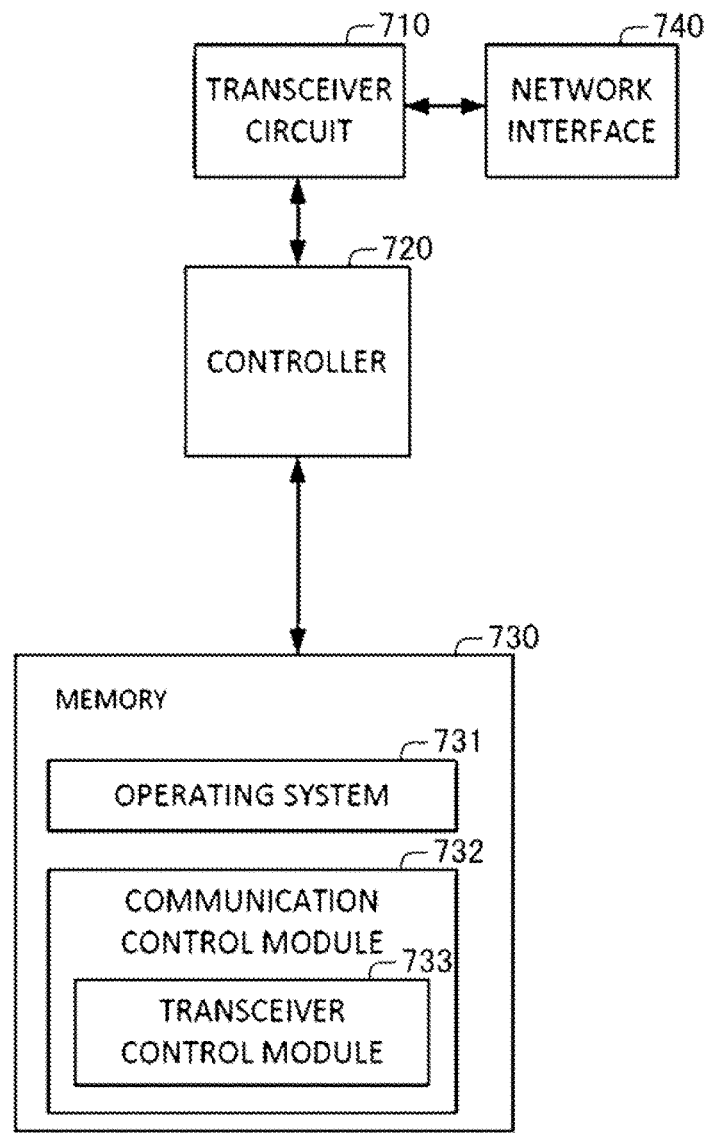
Figure 8: General block diagram for Core Network Nodes 70

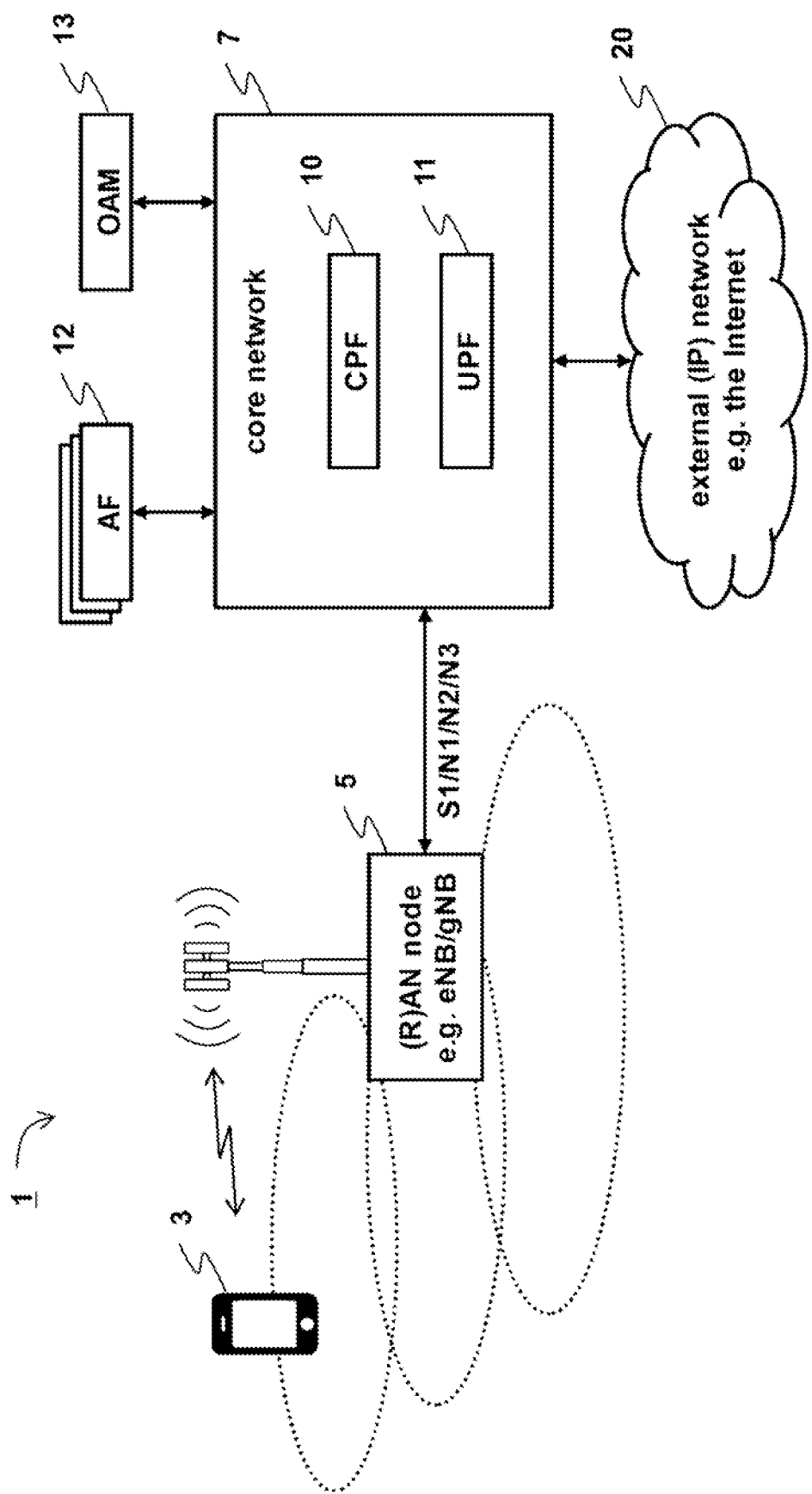
Figure 9 – System Overview

NETWORK DATA ANALYTICS FUNCTION, ACCESS AND MOBILITY FUNCTION, AND CONTROL METHOD FOR UE ANALYTICS ASSISTANCE FOR NETWORK AUTOMATION AND OPTIMISATION

This application is a National Stage Entry of PCT/JP2019/036963 filed on Sep. 20, 2019, which claims priority from European Patent Application 18197014.6 filed on Sep. 26, 2018, the contents of all of which are incorporated herein by reference, in their entirety.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular although not exclusive relevance to the provision of analytical results/information by a user equipment (UE) for performance improvement and supervision, the type of information collected by the network from UEs, the way in which the analytics information is collected by the UEs, and how the network uses the analytics information.

BACKGROUND ART

In last few years, Internet of Things (IoT) standards have evolved considerably. IoT allows applications, machines connected to the network to communicate among them or with servers without human intervention.

Most IoT applications require small data exchange with infrequent data transmissions and traditional mobile networks did not handle it efficiently.

In Rel-12, 3GPP added some enhancements to handle IoT requirements like low data traffic, low power consumption, and lower modem costs.

In Rel-13, 3GPP introduced a set of enhancements to support narrow band IoT applications which address improved indoor coverage, support for a large number of low throughput devices, low delay sensitivity, low device cost, low device power consumption and optimised network architecture.

In Rel-14, the 3GPP further extended the IoT (Internet of Things) features with improved power consumption, better handling for delay tolerant applications and more.

In Rel-15 (5G), along with further CIoT (Cellular Internet of Things) improvements one of the focus areas for 3GPP is mIoT (massive Internet of Things).

As 3GPP 5G specifications evolve, 3GPP cellular networks are ready for massive IoT roll-outs and can scale to support diverse IoT requirements.

SUMMARY OF INVENTION

Technical Problem

The mIoT feature is supposed to be popular in diverse usage scenarios and vertical industries. In some vertical industries, for a specific group, the service behaviours, data traffic and moving areas probably have obvious regularity.

The business models for 5G mIoT are diversified and the behaviours of mIoT terminals may vary a lot for different use cases, so requirements for quality of service and power saving are different.

mIoT is predicted to reach massive scale which is defined by 3GPP as at least 1 million devices per square kilometre which requires from the mobile networks a more efficient support for the simple devices that communicate infrequently, and are ultra-energy efficient so they can deliver an extremely long ten-year battery life.

Therefore, for the operators it is beneficial to be able to analyse the data produced by mobile terminals (normal mobile terminals and CIoT/mIoT devices) in order to optimise the service parameters for better performance.

In order to support performance improvements and supervision of the mobile terminals, the following issues are being investigated by the 3GPP (within the 5G CIoT study and eNA study items):

What analytical results/information can be provided by the mobile terminals for performance improvement and supervision.

What type of information from the mobile terminals is collected by the network;

How the network collects the analytics information from the mobile terminals.

How the network utilises the analytics information.

Solution to Problem

According to an aspect of the present disclosure, a Network Data Analytics Function, NWDAF, includes: means for receiving analytics information regarding cell re-selection by User Equipment, UE, among cells; and means for notifying another network node of matching the analytics information with an exception so that the other network node takes actions for solving the exception.

According to another aspect of the present disclosure, an Access and Mobility Function, AMF, includes: means for sending analytics information regarding cell re-selection by User Equipment, UE, among cells; means for receiving, from a Network Data Analytics Function, NWDAF, matching the analytics information with an exception; and means for taking actions for solving the exception.

According to another aspect of the present disclosure, a control method for a Network Data Analytics Function, NWDAF, includes: receiving analytics information regarding cell re-selection by User Equipment, UE, among cells; and notifying another network node of matching the analytics information with an exception so that the other network node takes actions for solving the exception.

According to another aspect of the present disclosure, a control method for an Access and Mobility Function, AMF, includes: sending analytics information regarding cell re-selection by User Equipment, UE, among cells; receiving, from a Network Data Analytics Function, NWDAF, matching the analytics information with an exception; and taking actions for solving the exception.

Advantageous Effects of Invention

In certain aspects, the NWDAF, the AMF, the control method for the NWDAF and the control method for the AMF may provide a technology for supporting performance improvements and supervision of the mobile terminals.

BRIEF DESCRIPTION OF DRAWINGS

FIG. 1 illustrates the procedure of the UE analytics information collection.

FIG. 2 illustrates the procedure of the UE analytics information collection based on the Network Exposure functionality via the UDM/UDR.

FIG. 3 illustrates the procedure of the UE analytics information collection based on the Network Exposure functionality via the AMF.

FIG. 4, describes the user consent provisioning for UE analytics data collection and delivery to the network.

FIG. 5 is a block diagram illustrating the main components of the UE.

FIG. 6 is a block diagram illustrating the main components of an exemplary (R)AN node.

FIG. 7 is a block diagram illustrating the main components of the AMF.

FIG. 8 is a block diagram illustrating the main components of a generic core network node (or function)

FIG. 9 schematically illustrates a mobile (cellular or wireless) telecommunication system to which the above aspects are applicable.

DESCRIPTION OF EMBODIMENTS

Solution 1—Mobile Terminal Analytics Information Collection (Variant 1)

Solution 1 allows for analytics information collection from mobile terminals (e.g. UEs, CIoT, mIoT, MTC (Machine Type Communication) devices) that is later used for network automation and optimisation (e.g. optimisation and improvement of the functionality of the Network Functions (NFs) like AMF, NSSF, PCRF (Policy and Charging Rules Function), SMF, UPF and more) and UE performance improvements. FIG. 1 illustrates the procedure of the UE analytics information collection.

Note: For further simplicity a UE 30 will be used as a common notation for all kinds of mobile terminals and devices including CIoT, NB-CIoT (Narrow Band CIoT), mIoT, MTC and etc.

The procedure highlighted in FIG. 1 is described in details below.

1. UE 30 sends Registration Request message to the AMF 71. The UE analytics report capability can be included by the UE 30 in the Registration Request message. The UE analytics report capability can also be relayed by the UE 30 to the AMF 71 in any other NAS message, e.g. in the Service Request message or during the PDU Session establishment or UE Configuration update procedures and more. Alternatively, the UE analytics report capability can be relayed to the AMF 71 by first relaying it to the (R)AN node 50 in any of the AS/RRC signalling messages (e.g. RRC Connection Establishment Request, RRC Connection Setup Complete) and then relaying it further to the AMF 71 or any other network node (e.g. AMF 71, PCRF, NWDAF 72, NSSF and more). The UE analytics report capability indicates the UE's capability for analytics collection and reporting. The UE analytics report capability can be a simple flag (True/False) or in the form of a bitmap definition or any other form or notation. A bitmap definition may potentially define what kind of analytics the UE 30 is capable of collecting and reporting. UE 30 may have single or multiple analytics report capabilities.

2. The AMF 71 invokes Nudm_SDM_Get service (or any other notation for a service request or a message for the purpose of UE subscription information retrieval) to the UDM/UDR 75 (Unified Data Management/User Data Repository) with the user identity (or referred as "UE_Id"). The AMF 71 may include the UE analytics report capability information element to the Nudm_SDM_Get message. The UDM/UDR 75 takes the UE analytics report capability information element into account when the UDM/UDR 75 generates the UE analytics report subscription information element in step 3 below.

3. The UDM/UDR 75 sends the UE analytics report subscription, the analytics information to be collected, the reporting method and NWDAF name information elements to the AMF 71 as a part of subscriber data in the Nudm_SDM_Get response (or any other notation for a service response or a message for the purpose of UE subscription information retrieval). The UE analytics report subscription is referred by the AMF 71 in order to verify:

whether the UE 30 is allowed to perform analytics information collection and delivery and optionally what type of analytics information can be collected and delivered by the UE 30;

whether the UE analytics information collection and delivery needs to be activated. In roaming, the home network operator may instruct visited PLMN to activate or deactivate the UE capability for one or more types of analytics data collection and delivery based on inputs from the service provider or based on interaction with the mobile terminals itself (e.g. considering mobile (i.e. user) preferences).

The analytics information to be collected information element is an optional parameter from the UDM/UDR 75 for the purpose to provide the UE 30 with detailed information about how the UE 30 measures statistics for the information collection indicated in the UE analytics report subscription. This is a parameter to supplement the analytics information. For example, if the analytics information is "UE in/out of a designated area", this parameter may contain information that is used to identify a designated area (e.g. a cell, list of cells, TA or any other way defined geographical area).

The reporting method information element indicates to the UE 30 when the collected data is to be reported to the NWDAF 72 (Network Data Analytics Function). It can be indicated by time period or certain condition to be met. For example, if the analytics information is "UE in/out of a designated area", this parameter may be set as when UE in/out counter exceeds a certain/defined number (e.g. a threshold value)".

The NWDAF name information element (e.g. NWDAF Id) indicates to the AMF 71 the NWDAF identity to which the AMF 71 shall send the UE analytics reports. The NWDAF name can be a form of IP (Internet Protocol) address or FQDN.

4. The AMF 71 sends Registration Accept message to the UE 30. The AMF 71 includes the UE analytics parameter status, the analytics information to be collected and the reporting method information element in the Registration Accept message.

The analytics parameter status information element may be built up by the AMF 71 based on the UE analytics report capability that is received in the Registration Request message as shown in step 1, the UE analytics report subscription information from the UDM/UDR 75 (e.g. via the subscription or user consent) as shown in step 3 and based on local configuration in the AMF 71. With this approach, the UE analytics parameter status can be constructed by taking both HPLMN requirement and VPLMN requirement together.

The AMF 71 may activate/de-activate one or more types of analytics data collection and delivery in the UE 30 by setting related flags in the UE analytics report status parameter included in the UE Registration Accept message. The UE analytics report status parameter may be a bitmap with designated status bit (active/not active) for each type of analytics data collection and delivery activation.

The analytics information to be collected information element is an optional parameter from the AMF 71 with the purpose to provide the UE 30 with detailed information on how the UE 30 measures statistics for the analytics parameter status indicated in this message. This is a parameter to supplement to the analytics information. For example, if the analytics information is "UE in/out of a designated area", this parameter may be used to define an area information (e.g. a cell, list of cells, TA or any other way defined geographical area).

The reporting method information element indicates to the UE 30 when the collected data is to be reported to the AMF 71. It can be indicated by time period and/or certain condition to be met. For example, if the analytics information is "UE in/out of a designated area", this parameter may be set as "when UE in/out counter exceeds a certain/defined number (e.g. a threshold value)" or when the events of entering and/or leaving the designated area occur.

Alternatively, the UE analytics parameter status, the analytics information to be collected and the reporting method information element may be delivered to the UE 30 via the UE Configuration Update procedure (or any other existing or new NAS or AS message) as a designated parameter (flags or bitmap) or as a part of the UE Policy parameter.

5. Based on the instruction from the AMF 71 in step 4, the UE 30 monitors, measures and collects statistics data. Based on the requested type(s) of the statistic to be collected and reported, the UE 30 may:

simply monitor events that are happening in the UE 30 and visible to the UE 30 (e.g. cell reselections, battery power level, number of link failures and etc), store the statistics for these events and report them based on the trigger conditions defined by the network in analytics information to be collected information element in step 4.

make use of a new functionality in order to monitor and collect new statistics data (e.g. number of ping pong reselections—when the reselections are only between neighbour cells, UE in/out of a designated area—entering or leaving designated areas, Number of out-of-service entries, number of call drops and etc). The UE 30 stores the statistics for these events and report them based on the trigger conditions defined by the network in analytics information to be collected information element in step 4.

6. If a condition for the reporting method is met, then the UE 30 sends the UE Analytics information message to the AMF 71. The UE 30 includes the UE analytics report information element in the UE Analytics information message. The UE analytics report contains the collected analytics information. The UE Analytics information message can be:

either a new message called UE Analytics Information message (or any other notation for a message for the purpose of analytics information delivery) or;

an existing message like Periodic RAU (Routing Area Update)/TAU (Tracking Area Update) message or Periodic Registration message or any other NAS or AS message.

UE analytics report information may be a data structure with designated fields for each type of analytics information.

7a-7b. The AMF 71 forwards the UE Analytics information message that is received from the UE 30 to both the V-NWDAF 73 and the H-NWDAF 74 or either the V-NWDAF 73 or H-NWDAF 74 depending on where the request on UE analytics report has come from. i.e., the UE Analytics information message can be both message 7a and 7b or either 7a or 7b in the FIG. 1. The V-NWDAF 73 address that the AMF 71 forwards the UE Analytics information message to may be locally configured in the AMF 71.

8a-8b. The NWDAF 72 collects the analytics information from the UE 30 and uses it for network automation and optimisation. Network functions like NSSF, AMF 71, PCF, SMF, UPF, UDM/UDR 75 and more may subscribe with the NWDAF 72 for one or for a set of analytics information and use that information for the purpose of network automation and optimisation and also for mobile terminal monitoring and improvements. This process can be 8a and 8b or either 8a or 8b in the FIG. 1.

The analytics information which is reported in the UE analytics report information element within the UE Analytics information message could be of the following types:

A) Number of cell re-selections—The UE 30 may monitor and report the number of cell re-selections (in general or only within the registration area) per defined time interval. The number of the cell re-selections per defined time, especially those within the same registration area (i.e. without UE 30 leaving the registration area) that are not noticeable for the network. This information could be of value for the network automation and optimisation and UE performance improvements.

Trigger—a trigger for reporting the number of the cell re-selections (all or just those within the registration area) could be the expiry of the periodic registration update timer, for example or when the number of the cell re-selections reaches a threshold (e.g. a threshold value defined or configured by the operator). The number of the cell re-selections information can be delivered to the network within an existing message like Periodic RAU/TAU/Registration or via a designated message as stated in FIG. 1.

Benefit—The number of the cell re-selections is an indication for the UE mobility that could benefit the network in its decision what shape and size of registration area to assign to the UE 30. If the UE 30 has reported the list of the cells it has re-selected and the order of re-selection, then the NWDAF 72 may analyse this information and may help the AMF 71 to assign to the UE 30 a registration area that is optimal in size and shape. The NWDAF 72 may also use UE analytics of the re-selected cells combined with analytics information provided from the service provider (e.g. geographical location of motorways or train lines) to construct the very best shape and size of registration area per that UE 30 (e.g. a registration area following the UE movement).

B) Number of ping-pong reselections—The UE 30 may monitor and report the number of cell re-selections between neighbour cells, i.e. the so called ping-pong re-selections. The number of the ping-pong re-selections per defined time could be of value for the network automation and optimisation, especially for stationary UE. The UE 30 may also provide along with the link failures the 3GPP Release version of the UE 30 which may help with the link failure cause analyses in the NWDAF 72.

Trigger—a trigger for reporting the number of ping-pong re-selections could be the expiry of the periodic registration update timer, for example or when the number of the ping-pong re-selections between neighbour cells reaches a threshold (e.g. defined or configured by the operator). The number of the ping-pong re-selections can be delivered to the network within an existing message like Periodic RAU/TAU/Registration or via a designated message as stated in FIG. 1.

Benefit—The number of the reselections between neighbour cells may indicate problems like ping-pong between neighbour cells which in some of the cases could be rectified:

either by the Service Provider (e.g. a stationary UE device like CIoT, mIoT or MTC device is at cell edge and ping-pongs to a neighbour cell. In this case the Service Provider can be notified and the Service Provider can adjust the location of the CIoT device) or by the 3GPP network operator via coverage adjustments or adjustment to the cell re-selection criteria (e.g. cell re-selection offset parameters broadcast in the System Information). It is also possible the location of the UE 30 to be adjusted to improve the UE signal.

C) Number of out-of-service entries—The UE 30 may monitor and report the number of out-of-service entries. There are cases when the UE 30 loses service in low coverage areas which is not noticeable by the network if the UE 30 is back to service before the next periodic update timer expires when the UE 30 is due to trigger a periodic update (a handshake) with the network. This analytics information could be of value for the purposes of network automation and optimisation and UE performance improvements.

Trigger—a trigger for reporting the number of out-of-service entries within the registration area could be:

the expiry of the periodic update timer which triggers the periodic update RAU/TAU/Registration message or when the number of the out-of-service entries by the UE 30 reaches a threshold (e.g. a threshold defined or configured by the operator) for certain time.

The number of out-of-service entries information can be delivered to the network within an existing message like Periodic RAU/TAU/Registration or via a designated message as stated in FIG. 1.

Benefit—The information about the number of out-of-service entries without change of the registration area may indicate problems like UE 30 often being in no coverage area (i.e. loosing service) for short periods of time. This information may be indicated to the network and/or the Service Provider (in case the UE 30 is not owned by the 3GPP) and the 3GPP network or the Service Provider may relocate the UE 30 (e.g. CIoT/mIoT/MTC device) or the 3GPP network operator may improve the radio coverage conditions in general or at the UE location (if stationary UE).

D) UE in/out of a designated area—The UE 30 may be configured (e.g. over the air or via NAS signalling) with a designated area (e.g. a cell, list of cells, TA or any other way defined geographical area). The UE 30 may monitor this designated area and the UE 30 may indicate to the network when entering and leaving such designated areas.

When the UE 30 is in this designated geographical area the UE 30 may be required to be served by specific network slice and when the UE 30 is not in this designated area—served by a different network slice. Such a use case may be a result from a requirement for the UE 30 (i.e. the user) to use one Network Slice when in the business premises or area (e.g. designated area) and another Network Slice when out of the business area.

The indications from the UE 30 when entering and leaving such designated areas could help the network automation and optimisation, for example with moving the UE 30 between Network Slices.

The UE in/out of designated area indication information can be delivered to the network within an existing message (e.g. a new trigger for the re-registration message) or via a designated message as stated in FIG. 1.

Trigger—UE in/out of a designated area indication could be triggered at the time when the UE 30 moves into designated area and when the UE 30 moves out of the designated area. This indication can help the network automation and optimisation and UE 30 monitoring and performance improvements Benefit—The UE in/out of a designated area indication can help the network automation and optimisation (e.g. Re-routing the UE 30 to different Network Slice (i.e. the UE 30 served by one Network Slice in the designated area and by different Network Slice out of the designated area), allocating different Periodic Update Timer, assigning different eDRX (extended Discontinuous Reception) cycle, better PSM (Power Saving Mode) and/or MICO (Mobile Initiated Connection Only) mode management and etc).

E) UE battery level indication—A battery powered UE 30 may monitor and report its battery level (e.g. battery level in percentage or remaining standby time or in any other form). This could be a requirement for certain remote battery powered UEs (e.g. CIoT, NB-CIoT, mIoT, MTC devices) for which there is no other convenient way to monitor the battery power at the UE 30 location. The battery power level indications from the UE 30 may help the network automation and optimisation and UE performance improvements Trigger—UE 30 may trigger UE battery power level indication to the network when the battery power level drops to or below a certain threshold level. This indication can help the network automation and optimisation and UE performance improvements The UE battery level indication information can be delivered to the network within an existing message (e.g. periodic updates or when the UE 30 is connecting to the network) or via a designated message as stated in FIG. 1

Benefit—The UE battery power level indication to the network may help with:

network adjustment to UE 30 related parameters like periodic update time, eDRX cycle length, PSM management and more so that the battery life of the UE 30 could be prolonged as much as possible. For example, increasing the periodic update timer, extending the eDRX cycle and PSM length would lead to less power consumption by the UE 30;

low battery power notification to the UE 30 owner (Service provider if the service provider's AF has subscribed with the NWDAF 72 for notification service when the UE battery power drops below certain level or threshold) so that the battery could be charged or replaced.

F) UE link failures—A UE 30 may monitor the number of link failures (e.g. link failures that prevent the UE 30 from establishing a connection with the network) per defined time interval. The number of link failures per defined time could be of value for the network automation and optimisation and UE performance improvements. The UE 30 may also provide along with the link failures the 3GPP Release version of the UE's software build which may help with the link failure cause analyses in the NWDAF 72.

Trigger—a trigger for reporting the number of UE link failures could be the expiry of the periodic registration update timer, for example or when the number of the UE link failures reaches a threshold (e.g. defined or configured by the operator). The number of the UE link failures information can be delivered to the network within an existing message like Periodic RAU/TAU/Registration or via a designated message as stated in FIG. 1.

Benefit—The number of the UE link failures may be analysed by the NWDAF 72 in terms of numbers, time and location they take place and the NWDAF 72 may derive assumption about the possible causes for the UE link failures and how to fix them.

G) UE call drops—A UE 30 may monitor the number of call drops (e.g. call drops due to link failures, handover failures or any other failure that results in losing the already established user connection known as a call-drop) per defined time interval. The number of UE call drops per defined time could be of value for the network automation and optimisation and UE performance improvements.

Trigger—a trigger for reporting the number of UE call drops could be the expiry of the periodic registration update timer, for example or when the number of the UE call drops reaches a threshold (e.g. defined or configured by the operator). The number of the UE call drops information can be delivered to the network within an existing message like Periodic RAU/TAU/Registration or via a designated message as stated in FIG. 1.

Benefit—The number of the UE call drops may be analysed by the NWDAF 72 in terms of numbers, time and location they take place and the NWDAF 72 may derive assumption about the possible causes for the UE call drops and how to fix them.

Solution 2—Mobile Terminal Analytics Information Collection (Variant 2)

Solution 2 allows for analytics information collection from mobile terminals (e.g. UEs, CIoT, mIoT, MTC devices) that is later used for network automation and optimisation (e.g. optimisation and improvement of the functionality of the Network Functions (NFs) like AMF 71, NSSF, PCRF, SMF, UPF and more) and UE performance improvements. FIG. 2 illustrates the procedure of the UE analytics information collection based on the Network Exposure functionality via the UDM/UDR 75. This procedure is based on the NEF service operation as is described in the 3GPP TS 23.502 [3]. This procedure can be used for both Home PLMN and Visited PLMN for the mobile terminal analytics information collection. The AF 12 or the NWDAF 72 in Solution 2 can be owned by Home PLMN operator, Visited PLMN operator or 3rd party.

The procedure highlighted in FIG. 2 is described in details below.

0. The registration procedure has been successfully performed among the UE 30, the AMF 71 and the UDM/UDR 75. This procedure can be made based on the registration procedure as described in the 3GPP TS 23.502 [3] with the additional functionality as described in step 1 to step 4 in the solution 1.

1. The NWDAF 72 invokes the Nnef_EventExposure_Subscribe service to the NEF 76 as an AF 12. The NWDAF 72 includes the UE analytics report AF, the analytics information to be collected and the reporting method information elements to the NEF 76 in the Nnef_EventExposure_Subscribe message. The UE analytics report AF information element is referred by the NEF 76 in order to verify:

whether the UE 30 is allowed to perform analytics information collection and delivery and optionally what type of analytics information can be collected and delivered by the UE 30;

whether the UE analytics information collection and delivery needs to be activated. The home network operator may instruct Visited PLMN to activate or deactivate the UE capability for one or more types of analytics data collection and delivery based on inputs from the service provider or based on interaction with the mobile terminals itself (e.g. consider mobile preferences).

The analytics information to be collected information element is an optional parameter from the NWDAF 72 with the purpose to provide the UE 30 with detailed information on how the UE 30 measures statistics for the information collection indicated in the UE analytics report subscription. This is a parameter to supplement to the analytics information. For example, if the analytics information is "UE in/out of a designated area", this parameter may be used to designate an area information (e.g. a cell, list of cells, TA or any other way defined geographical area).

The reporting method information element indicates to the UE 30 when the collected data to be reported to the NWDAF 72. It can be indicated by time period, certain condition to be met. For example, if the analytics information is "UE in/out of a designated area", this parameter may be set as when UE in/out counter exceeds a certain defined number/value (e.g. a threshold value) or when the events of entering and/or leaving the designated area occur.

2. The NEF 76 invokes the Nudm_EventExposure_Subscribe service to the UDM/UDR 75. The NEF 76 includes the UE analytics report AF, the analytics information to be collected and the reporting method information elements to the Nudm_EventExposure_Subscribe message. The UE analytics report AF, the analytics information to be collected and the reporting method information elements can be ones that have been received by the Nnef_EventExposure_Subscribe message in step 1.

3. The UDM/UDR 75 invokes the Namf_EventExposure_Subscribe service to the AMF 71. The UDM/UDR 75 includes the UE analytics report subscription, the analytics information to be collected and the reporting method information elements to the Namf_EventExposure_Subscribe message. The analytics information to be collected and the reporting method information elements can be ones that have been received by the Nudm_EventExposure_Subscribe message in step 2. The UE analytics report subscription information element can be constructed by the UDM/UDR 75 based on the subscription data in the UDM/UDR 75 and taking into account the UE analytics report AF information element that the UDM/UDR 75 has received in the Nudm_EventExposure_Subscribe message in FIG. 2, step 2.

The UE analytics report subscription information element is referred by the AMF 71 in order to verify:

whether the UE 30 is allowed to perform analytics information collection and delivery and optionally what type of analytics information can be collected and delivered by the UE 30;

whether the UE analytics information collection and delivery needs to be activated. The home network operator may instruct Visited PLMN to activate or deactivate the UE capability for one or more types of analytics data collection and delivery based on inputs from the Service Provider or based on interaction with the mobile terminals itself (e.g. consider mobile preferences).

4. The AMF 71 sends NAS message to the UE 30. The AMF 71 includes the UE analytics parameter status, the analytics information to be collected and the reporting method information element in the NAS message. The NAS message can be the Registration accept message, the UE Configuration Update message, UE DL data transfer message or any other existing or new NAS message.

The analytics parameter status information element may be built up by the AMF 71 based on UE analytics report capability that may have been previously received in the Registration Request message as shown in the step 1 of the FIG. 1, the UE analytics report subscription information from the UDM/UDR 75 (e.g. via the subscription or user consent) as shown in step 3 and also based on local configuration in the AMF 71. With this approach, the UE analytics parameter status can be defined by taking both HPLMN requirement and VPLMN requirement together.

The AMF 71 may activate/de-activate one or more types of analytics data collection and delivery by the UE 30 by setting related flags in the UE analytics report status parameter included in the NAS message. The UE analytics report status parameter may be a bitmap with designated status bit (active/not active) for each type of analytics data collection and delivery.

The analytics information to be collected information element is an optional parameter from the AMF 71 to provide UE detail information on how the UE 30 measures statistics for the analytics parameter status indicated in this message. This is a parameter to supplement the analytics information. For example, if the analytics information is "UE in/out of a designated area", this parameter may be used to define an area information (e.g. a cell, list of cells, TA or any other way defined geographical area).

The reporting method information element indicates to the UE 30 when a collected data to be reported to the AMF 71. It can be indicated by time period or certain condition to be met. For example, if the analytics information is "UE in/out of a designated area", this parameter may be set as "when UE in/out counter exceeds certain/defined number" or when the events of entering and/or leaving the designated area occur.

Alternatively, the UE analytics parameter status, the analytics information to be collected and the reporting method information element may be delivered to the UE 30 via the UE Configuration Update procedure (or any other existing or new NAS/AS message for the purpose of delivering the above mentioned analytics parameters) as designated parameters (flags or bitmap) or as a part of the UE Policy parameter.

5. The AMF 71 sends the Namf_EventExposure_Subscribe response message to the UDM/UDR 75.

6. The UDM/UDR 75 sends the Nudm_EventExposure_Subscribe response message to the NEF 76.

7. The NEF 76 sends the Nnef_EventExposure_Subscribe response message to the NWDAF 72.

8. Based on the instruction from the AMF 71 in step 4, The UE 30 measures and corrects statistics.

9. If a condition for the reporting method is met, then the UE 30 sends the UE Analytics information message to the AMF 71. The UE 30 includes the UE analytics report information element in the UE Analytics information message. The UE analytics report has the collected analytics information. The UE Analytics information message can be either a new message called UE Analytics Information message (or any other notation for a message for the purpose of analytics information delivery) or an existing message like Periodic RAU/TAU Update message or Periodic Registration message or any other NAS or AS message.

UE analytics report information may be a data structure with designated fields for each type of analytics information.

10. The AMF 71 sends the Namf_EventExposure_Notify message to the NEF 76. The Namf_EventExposure_Notify message includes UE analytics report that is received from the UE 30. As the AMF 71 receives the NEF associated notification endpoint in the Namf_EventExposure_Subscribe in step 3, the associated NEF 76 is known by the AMF 71.

11. The NEF 76 sends the Nnef_EventExposure_Notify message to the NWDAF 72. 12. The NWDAF 72 collects the analytics information from the UE 30 and uses it for network automation and optimisation. Network functions like NSSF, AMF 71, PCF, SMF, UPF, UDM/UDR 75 and more may subscribe with the NWDAF 72 for one or for a set of analytics information and use that information for the purpose of network automation and optimisation and also for mobile terminal improvement and monitoring.

Though FIG. 2 illustrates only the Mobile terminal analytics information collection activation procedure, the Mobile terminal analytics information collection deactivation procedure can be referred with the following modifications to FIG. 2.

Step 1: The Nnef_EventExposure_Subscribe service to be replaced with the Nnef_EventExposure_Unsubscribe service.

Step 2: The Nudm_EventExposure_Subscribe service to be replaced with the Nudm_EventExposure_Unsubscribe service.

Step 3: The Namf_EventExposure_Subscribe service to be replaced with the Namf_EventExposure_Unsubscribe service.

Step 5: The Namf_EventExposure_Subscribe response message to be replaced with the Namf_EventExposure_Unsubscribe response message.

Step 6: The Nudm_EventExposure_Subscribe response message to be replaced with the Nudm_EventExposure_Unsubscribe response message.

Step 7: The Nnef_EventExposure_Subscribe response message to be replaced with the Nnef_EventExposure_Unsubscribe response message.

Step 8: to be removed.

Step 9: The message number 4 can be a trigger for UE 30 to send the message in step 9 in order to make a last report to the service subscribed by the NWDAF 72.

Solution 3—Mobile Terminal Analytics Information Collection (Variant 3)

Solution 3 allows for analytics information collection from mobile terminals (e.g. UEs, CIoT, mIoT, MTC devices) that is later used for network automation and optimisation (e.g. optimisation and improvement of the functionality of the Network Functions (NFs) like AMF 71, NSSF, PCRF, SMF, UPF and more) and UE performance improvements. FIG. 3 illustrates the procedure of the UE analytics information collection based on the Network Exposure functionality via the AMF 71. This procedure is based on the AMF service operation as described in the 3GPP TS 23.502 [3]

This procedure can be used for both Home PLMN and Visited PLMN for the Mobile terminal analytics information collection. The AF 12 or the NWDAF 72 in the Solution 3 can be owned by Home PLMN operator, Visited PLMN operator or 3rd party.

The procedure highlighted in FIG. 3 is described in detail below.

0. The registration procedure has been successfully performed among the UE 30, the AMF 71 and the UDM/UDR 75. This procedure can be made based on the registration procedure as described in the 3GPP TS 23.502 [3] with the additional functionality as described in step 1 to step 4 in the Solution 1.

1. The NEF 76 invokes the Namf_EventExposure_Subscribe service to the AMF 71. The NEF 76 includes the UE analytics report AF, the analytics information to be collected and the reporting method information elements to the Namf_EventExposure_Subscribe message. The UE analytics report AF information element is referred by the AMF 71 in order to verify:

whether the UE 30 is allowed to perform analytics information collection and delivery and optionally what type of analytics information can be collected and delivered by the UE 30;

whether the UE analytics information collection and delivery needs to be activated. A requester, via the NEF 76, may instruct Visited PLMN to activate or deactivate the UE capability for one or more types of analytics data collection and delivery based on inputs from the service provider or based on interaction with the mobile terminals itself (e.g. consider mobile preferences).

2. The AMF 71 sends the NAS message to the UE 30. The AMF 71 includes the UE analytics parameter status, the analytics information to be collected and the reporting method information element in the NAS message. The NAS message can be the Registration accept message, the UE Configuration Update message, UE DL data transfer message or any existing or new NAS message.

The analytics parameter status information element may be built up by the AMF 71 based on the UE analytics report capability that may have been previously received in the Registration Request message as shown in the step 1 of the FIG. 1, the UE analytics report AF information from the NEF 76 as shown in step 1 and based on local configuration in the AMF 71. With this approach, the UE analytics parameter status can be defined by taking into account both, the requester's requirement and VPLMN requirement together.

The AMF 71 may activate/de-activate one or more types of analytics data collection and delivery in the UE 30 by setting related flags in the UE analytics report status parameter included in the NAS message. The UE analytics report status parameter may be a bitmap with designated status bit (active/not active) for each type of analytics data collection and delivery activation.

The analytics information to be collected information element is an optional parameter from the AMF 71 with the purpose to provide to the UE 30 a detailed information on how the UE 30 measures statistics for the analytics parameter status indicated in this message. This is a parameter to supplement to the analytics information. For example, if the analytics information is "UE in/out of a designated area", this parameter may be used to designate an area information (e.g. a cell, list of cells, TA or any other way defined geographical area).

The reporting method information element indicates to the UE 30 when a collected data to be reported to the AMF 71. It can be indicated by time period, certain condition to be met. For example, if the analytics information is "UE in/out of a designated area", this parameter may be set as "when UE in/out counter exceeds a certain/defined number" or when the events of entering and/or leaving the designated area occur.

Alternatively, the UE analytics parameter status, the analytics information to be collected and the reporting method information element may be delivered to the UE 30 via the UE Configuration Update procedure as a designated parameter (flags or bitmap) or as a part of the UE Policy parameter.

4. Based on the instruction from the AMF 71 in step 2, The UE 30 measures and corrects statistics data. Based on the requested type(s) of the statistic to be collected and reported, the UE 30 may:

simply monitor events that are happening in the UE 30 and visible to the UE 30 (e.g. cell reselections, battery power level, number of link failures and etc), store the statistics for these events and report them based on the trigger conditions defined by the network in analytics information to be collected information element in step 2.

make use of a new functionality in order to monitor and collect new statistics data (e.g. number of ping pong reselections—when the reselections are only between neighbours cells, UE in/out of a designated area—entering or leaving designated areas, Number of out-of-service entries and etc). The UE 30 stores the statistics for these events and report them based on the trigger conditions defined by the network in analytics information to be collected information element in step 2.

5. If a condition for the reporting is met, then the UE 30 sends the UE Analytics information message to the AMF 71. The UE 30 includes the UE analytics report information element in the UE Analytics information message. The UE analytics report contains the collected analytics information. The UE Analytics information message can be either a new message called UE Analytics Information message (or any other notation for a message for the purpose of analytics information delivery) or an existing message like Periodic RAU/TAU Update message or Periodic Registration message or any other NAS or AS message.

UE analytics report information may be a data structure with designated fields for each type of analytics information.

6. The AMF 71 sends the Namf_EventExposure_Notify message to the NWDAF 72. The Namf_EventExposure_Notify message includes UE analytics report that is received from the UE 30. As the AMF 71 receives the associated notification endpoint of the NWDAF 72 in the Namf_EventExposure_Subscribe in step 1, the associated NWDAF 72 is known by the AMF 71.

7. The NWDAF 72 collects the analytics information from the UE 30 and uses it for network automation and optimisation. Network functions like NSSF, AMF 71, PCF, SMF, UPF, UDM/UDR 75 and more may subscribe with the NWDAF 72 for one or for a set of analytics information and use that information for the purpose of network automation and optimisation and also for mobile terminal monitoring.

Though the FIG. 3 illustrates only the Mobile terminal analytics information collection activation procedure, the Mobile terminal analytics information collection deactivation procedure can be referred with the following modifications for steps in the FIG. 3.

Step 1: The Namf_EventExposure_Subscribe service to be replaced with the Namf_EventExposure_Unsubscribe service.

Step 3: The Namf_EventExposure_Subscribe response message to be replaced with the Namf_EventExposure_Unsubscribe response message.

Step 4: to be removed.

Step 5: The message in step 2 can be a trigger for UE 30 to send the message in step 5 in order to make a last report to the service subscribed by the NWDAF 72.

Solution 4—User Consent Handling for UE Analytics Collection

As the UE analytics collection would involve a signalling interaction with the UE 30, user consent for collecting and delivering UE analytics is likely to be required because of the possible privacy and/or legal obligations. It is network operator's responsibility to collect and manage the user consent, if required, before initiating (i.e. requesting) UE analytics collection and reporting by the UE 30.

The user consent information can be considered as part of the subscription data. FIG. 4, describes the user consent provisioning for UE analytics data collection and delivery to the network.

The procedure highlighted in FIG. 4 is described in details below.

1. AF (Application Function) User Consent Provision (UE_Id, UE analytics consent bitmap)—The Service Provider may collect the user consent for UE analytics data collection from its users and provide the information to the 3GPP network via the UE analytics consent bitmap parameter (or any other notation for provision of user consent for the purpose of UE analytics collection and reporting) along with the UE Id for which the user consent applies, within the AF User Consent Provision message (or any other notation for a message for the purpose of user consent provision for UE analytics data collection and report). The service provider (e.g. AF 12) may use this message for user consent update or revocation as well. The user consent for UE analytics data collection and reporting is stored in the UDM/UDR 75 as a subscription information. The UE analytics consent bitmap parameter may be a simple flag (e.g. a consent for single type of analytics data) or a bitmap that defines the user consent for a set of analytics data to be collected and reported by the UE 30. Once the user consent information is stored in the UDM/UDR 75, the UDM/UDR 75 can check the user consent status before activating any UE analytics collection and reporting from the UE 30 (e.g. before starting a trace session for given analytics data collection and reporting subscription).

2. OAM (Operation Administration and Maintenance) User Consent Provision (UE_Id, UE analytics consent bitmap)—The user consent could also be provisioned by the network operator via the OAM. The network operator can collect the user consent information via its customer care process, for example. As in step 1 the network operator provides the UE Id for which user consent is applicable and the user consent itself within the UE analytics consent bitmap parameter which is stored in the UDM/UDR 75 as a subscription information. The network operator (e.g. OAM) may use this message for user consent update or revocation as well. The UE analytics consent bitmap parameter may be a simple flag (e.g. a consent for single type of analytics data) or a bitmap that defines the user consent for a set of analytics data to be collected and reported by the UE 30. Once the user consent information is stored in the UDM/UDR 75, the UDM/UDR 75 can check the user consent status before activating any UE analytics collection from the UE 30 (e.g. before starting a trace session for given analytics data collection and reporting subscription).

3. NAS User Consent Update (UE_Id, analytics consent bitmap)—The UE analytics consent information (per a single type of analytics data or per set of analytics data, depending on what types of analytics data the UE 30 is subscribed to) is provided to the AMF 71 (e.g. at location update procedure e.g. via Nudm_SDM_Get/Response procedure or any other procedure name where the AMF 71 retrieves the UE subscription information for UE analytics data collection and reporting and also retrieves the user consent from the UDM/UDR 75). This is required when the UE analytics data collection (i.e. trace session) is started by the AMF 71.

4. AS User Consent Update (UE_Id, analytics consent bitmap)—Similarly to step 3, the UE consent information can also be provided to the (R)AN node 50, via the AMF 71 for example, for the analytics data that is collected by the ((R)AN) node. This is required when the UE analytics data collection and reporting (i.e. trace session) is started by the (R)AN node 50.

5. UE Analytics Information (UE Analytics report)—A UE 30 that is capable of analytics information collection and delivery, monitors and collects the analytics information (if the feature is activated and not restricted by the user consent). Based on the requested type(s) of the statistics data to be collected and reported, the UE 30 may:

simply monitor events that are happening in the UE 30 and visible to the UE 30 (e.g. cell reselections, battery power level, number of link failures and etc), store the statistics for these events and report them based on the trigger conditions defined by the network in analytics information to be collected information element in step 4 of FIG. 1.

make use of a new functionality in order to monitor and collect new statistics data (e.g. number of ping pong reselections—when the reselections are only between neighbours cells, UE in/out of a designated area—entering or leaving designated areas, number of out-of-service entries and etc). The UE 30 stores the statistics for these events and report them based on the trigger conditions defined by the network in analytics information to be collected information element in step 4 of FIG. 1.

The UE 30 delivers the collected analytics information to the network within UE analytics report parameter:

either in a new message called UE Analytics Information message (or any other notation for a message for the purpose of analytics information delivery) or;

in an existing message like Periodic RAU/TAU Update message or Periodic Registration message or any other NAS or AS message.

UE analytics report parameter may be a data structure with designated fields for each type of analytics information.

6. UE Analytics Indication (UE_Id, UE analytics report)—AMF 71 may indicate the UE analytics report to the NWDAF 72 where the analytics data is processed and analysed, very often in conjunction with the information provided by the Service provider.

User Equipment (UE 30)

FIG. 5 is a block diagram illustrating the main components of the UE 30. As shown, the UE 30 includes a transceiver circuit 320 which is operable to transmit signals to and to receive signals from the connected node(s) via one or more antenna 310. Although not necessarily shown in FIG. 5, the UE 30 will of course have all the usual functionality of a conventional mobile device (such as a user interface 350) and this may be provided by any one or any combination of hardware, software and firmware, as appropriate. Software may be pre-installed in the memory 340 and/or may be downloaded via the telecommunication network or from a removable data storage device (RMD), for example.

A controller 330 controls the operation of the UE 30 in accordance with software stored in a memory 340. For example, the controller 330 may be realised by Central Processing Unit (CPU). The software includes, among other things, an operating system 341 and a communication control module 342 having at least a transceiver control module 343. The communication control module 342 (using its transceiver control module 343) is responsible for handling (generating/sending/receiving) signalling and uplink/downlink data packets between the UE 30 and other nodes, such as the base station 5/(R)AN node 50, a MME, the AMF 71

(and other core network nodes 70). Such signalling may include, for example, appropriately formatted signalling messages relating to connection establishment and maintenance (e.g. RRC messages), NAS messages such as periodic location update related messages (e.g. tracking area update, paging area updates, location area update) etc. Such signalling may include, amongst other things, appropriately formatted signalling relating to UE analytics reporting and utilisation.

(R)AN Node 50

FIG. 6 is a block diagram illustrating the main components of an exemplary (R)AN node 50, for example a base station ('eNB' in LTE, 'gNB' in 5G). As shown, the (R)AN node 50 includes a transceiver circuit 520 which is operable to transmit signals to and to receive signals from connected UE(s) 30 via one or more antenna 510 and to transmit signals to and to receive signals from other network nodes (either directly or indirectly) via a network interface 550. A controller 530 controls the operation of the (R)AN node 50 in accordance with software stored in a memory 540. For example, the controller 530 may be realised by Central Processing Unit (CPU). Software may be pre-installed in the memory 540 and/or may be downloaded via the telecommunication network or from a removable data storage device (RMD), for example. The software includes, among other things, an operating system 541 and a communication control module 542 having at least a transceiver control module 543.

The communication control module 542 (using its transceiver control module 543) is responsible for handling (generating/sending/receiving) signalling between the (R)AN node 50 and other nodes, such as the UE 30, the MME, the AMF 71 (e.g. directly or indirectly). The signalling may include, for example, appropriately formatted signalling messages relating to a radio connection and location procedures (for a particular UE 30), and in particular, relating to connection establishment and maintenance (e.g. RRC connection establishment and other RRC messages), periodic location update related messages (e.g. tracking area update, paging area updates, location area update), S1 AP messages and NGAP messages (i.e. messages by N2 reference point), etc. Such signalling may also include, for example, broadcast information (e.g. Master Information and System information) in a sending case. Such signalling may include, amongst other things, appropriately formatted signalling relating to UE analytics reporting and utilisation.

The controller 530 is also configured (by software or hardware) to handle related tasks such as, when implemented, UE mobility estimate and/or moving trajectory estimation.

AMF 71

FIG. 7 is a block diagram illustrating the main components of the AMF 71. The AMF 71 is included in the 5GC. As shown, the AMF 71 includes a transceiver circuit 711 which is operable to transmit signals to and to receive signals from other nodes (including the UE 30) via a network interface 741. A controller 721 controls the operation of the AMF 71 in accordance with software stored in a memory 735. For example, the controller 721 may be realised by Central Processing Unit (CPU). Software may be pre-installed in the memory 735 and/or may be downloaded via the telecommunication network or from a removable data storage device (RMD), for example. The software includes, among other things, an operating system 736 and a communication control module 737 having at least a transceiver control module 738.

The communication control module 737 (using its transceiver control module 738) is responsible for handling (generating/sending/receiving) signalling between the AMF 71 and other nodes, such as the UE 30, base station 5/(R)AN node 50 (e.g. "gNB" or "eNB") (directly or indirectly). Such signalling may include, for example, appropriately formatted signalling messages relating to the procedures described herein, for example, NG AP message (i.e. a message by N2 reference point) to convey an NAS message from and to the UE 30, etc. Such signalling may include, amongst other things, appropriately formatted signalling relating to UE analytics reporting and utilisation.

Core Network Node 70

FIG. 8 is a block diagram illustrating the main components of a generic core network node 70 (or function) as described above such as 5G nodes/functions including the AMF 71, NWDAF 72, NEF 76, UDM/UDR 75 etc. (and/or EPC nodes/functions such as the MME or the like). It will be appreciated that the same block diagram may be applicable to the AF 12 and the nodes of the OAM as well. As shown, the core network node 70 includes a transceiver circuit 710 which is operable to transmit signals to and to receive signals from other nodes (including the UE 30 and the (R)AN node 50) via a network interface 740. A controller 720 controls the operation of the core network node 70 in accordance with software stored in a memory 730. The software may be pre-installed in the memory 730 and/or may be downloaded via the telecommunication network or from a removable data storage device (RMD), for example. The software includes, among other things, an operating system 731 and at least a communication control module 732. The communication control module 732 is responsible for handling (generating/sending/receiving) signaling between the core network node 70 and other nodes, such as the UE 30, (R)AN node 50, the AFs 12, and other core network nodes 70. Such signalling may include, amongst other things, appropriately formatted signalling relating to UE analytics reporting and utilisation.

System Overview

FIG. 9 schematically illustrates a mobile (cellular or wireless) telecommunication system 1 to which the above aspects are applicable.

In this network, users of mobile devices 3 (UEs 30) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 9 for illustration purposes, the system, when implemented, will typically include other base stations and mobile devices 3 (UEs 30).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports NextGeneration/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes 70 via an appropriate interface (such as the so-called 'S1', 'N1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) 10 such as the AMF 71, NWDAF 72, NEF 76, UDM/UDR 75 etc. and user plane functions (UPFs) 11. In this example, the core network 7 is coupled to at least one AF 12 (e.g. via the Internet) and an OAM 13 system. It will be appreciated that the core network 7 may also include one or more other functions. From the core network 7, connection to an external IP network 20 (such as the Internet) is also provided.

The components of this system 1 are configured to perform the above described exemplary aspects.

SUMMARY

The different solutions are summarised below.
Solution 1:
1) UE capability for analytics report indication at registration procedure;
2) UE analytics report status verification with the UDM/UDR 75 to check for subscription and user consent status.
3) UE analytics capability report activation/deactivation at registration procedure and at UE configuration procedure
4) UE statistics data collection and deliver to NWDAF 72—number of UE cell re-selections, number of UE ping-pong re-selections, number of UE out-of-service entries, UE in/out of a designated area, UE battery level indication, UE link failures, UE call drops.
Solution 2:
Solution 1 plus UE analytics information collection based on the Network Exposure functionality via the UDM/UDR 75
Solution 3:
Solution 1 plus UE analytics information collection based on the Network Exposure functionality via the AMF 71
Solution 4:
1) UE analytics data user consent provision by the Service Provider (AF) and the network operator (OMA (Open Mobile Alliance)).
2) UE analytics bitmap and UE analytics user consent stored in the UDM/UDR 75 as a subscription data.
3) UE analytics user consent update in the NAS (AMF 71) and AS ((R)AN node 50).

In summary, a method of UE analytics assistance for network automation and optimisation is described that comprises the steps of
For Solution 1:
1) UE capability for analytics report indication at registration procedure;
2) UE analytics report status retrieval from the UDM/UDR 75
3) UE analytics capability report activation/deactivation at registration procedure.
4) UE analytics capability report activation/deactivation at UE configuration update procedure
5) UE statistics data collection and delivery to NWDAF 72—number of cell re-selections, number of ping-pong re-selections, number of out-of-service entries, UE in/out of a designated area, UE battery level indication, UE link failures, UE call drops.
6) UE statistics data analysis by the NWDAF 72 to assist network automation and optimisation.
For Solution 2:
Solution 1 plus UE analytics information collection based on the Network Exposure functionality via the UDM/UDR 75.
For Solution 3:
Solution 1 plus UE analytics information collection based on the Network Exposure functionality via the AMF 71.
For Solution 4:
1) UE analytics data user consent provision by the Service Provider (AF) and the network operator (OMA).
2) UE analytics bitmap and UE analytics user consent stored in the UDM/UDR 75 as a subscription data.
3) UE analytics user consent update in the NAS (AMF 71) and AS ((R)AN node 50).
Benefits
The aspects described provide multiple types of analytics data collection and delivery to the network to assist the network automation and optimisation and UE 30 monitoring and performance improvements.

Modifications and Alternatives

Detailed aspects have been described above. As those skilled in the art will appreciate, a number of modifications and alternatives can be made to the above aspects whilst still benefiting from the disclosures embodied therein. By way of illustration only a number of these alternatives and modifications will now be described.

Any NAS messages mentioned above may be transmitted between the UE 30 and AMF 71 via a NG-(R)AN node (i.e. gNB).

Furthermore, a part of sequences, procedures or messages mentioned above may be not always needed for identifying one or more disclosures.

The User Equipment 30 (or "UE", "mobile station", "mobile device" or "wireless device") in the present disclosure is an entity connected to a network via a wireless interface.

It should be noted that the UE 30 in this specification is not limited to a dedicated communication device, and can be applied to any device, having a communication function as a UE 30 described in this specification, as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery.

It will be appreciated that the terms "UE" and "wireless device" also encompass devices that remain stationary for a long period of time.

A UE 30 may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE 30 may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE 30 may, for example, be an item of information and communication equipment (for example information and communication equipment such as: electronic computer and related equipment; communication and related equipment; electronic components etc.).

A UE 30 may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE 30 may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE 30 may, for example, be an electronic lamp, a luminaire, a measuring instrument, an analyser, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE 30 may, for example, be a wireless-equipped personal digital assistant or related equipment (such as a wireless card or module designed for attachment to or for insertion into another electronic device (for example a personal computer, electrical measuring machine)).

A UE 30 may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE 30 may support one or more IoT or MTC applications. Some examples of MTC applications are listed in the Table 1 (source: 3GPP TS 22.368 [3], Annex B, the contents of which are incorporated herein by reference). This list is not exhaustive and is intended to be indicative of some examples of machine-type communication applications.

TABLE 1

Some examples of machine type communication applications.

| Service Area | MTC applications |
| --- | --- |
| Security | Surveillance systems |
| | Backup for landline |
| | Control of physical access |
| | (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote | Sensors |
| Maintenance/Control | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch eXchange) system, a PHS (Personal Handy-phone System)/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and aspects described in the present document. Needless to say, these technical ideas and aspects are not limited to the above-described UE and various modifications can be made thereto.

In the above description, the UE 30, the (R)AN node 50, and the core network node 70 are described for ease of understanding as having a number of discrete modules (such as the communication control modules). Whilst these modules may be provided in this way for certain applications, for example where an existing system has been modified to implement the disclosure, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above aspects, a number of software modules were described. As those skilled in the art will appreciate, the software modules may be provided in compiled or un-compiled form and may be supplied to the UE 30, the (R)AN node 50, and the core network node 70 as a signal over a computer network, or on a recording medium. Further, the functionality performed by part or all of this software may be performed using one or more dedicated hardware circuits. However, the use of software modules is preferred as it facilitates the updating of the UE 30, the (R)AN node 50, and the core network node 70 in order to update their functionalities.

The above aspects are also applicable to 'non-mobile' or generally stationary user equipment.

Various other modifications will be apparent to those skilled in the art and will not be described in further detail here.

Abbreviations and Terminology

5GC 5G Core Network
5GS 5G System
5G-AN 5G Access Network
5G-GUTI 5G Globally Unique Temporary Identifier
5G S-TMSI 5G S-Temporary Mobile Subscription Identifier
5QI 5G QoS Identifier
AF Application Function
AMF Access and Mobility Management Function
AN Access Node
AS Access Stratum
AUSF Authentication Server Function
CM Connection Management
CP Control Plane
CSFB Circuit Switched (CS) Fallback
DL Downlink
DN Data Network
DNAI DN Access Identifier
DNN Data Network Name
EDT Early Data Transmission
EPS Evolved Packet System
EPC Evolved Packet Core
FQDN Fully Qualified Domain Name
GFBR Guaranteed Flow Bit Rate
GMLC Gateway Mobile Location Centre
GPSI Generic Public Subscription Identifier
GUAMI Globally Unique AMF Identifier
HPLMN Home Public land mobile network
HR Home Routed (roaming)
I-RNTI I-Radio Network Temporary Identifier
LADN Local Area Data Network
LBO Local Break Out (roaming)
LMF Location Management Function
LRF Location Retrieval Function
MAC Medium Access Control
MFBR Maximum Flow Bit Rate
MICO Mobile Initiated Connection Only
MME Mobility Management Entity
N3IWF Non-3GPP Inter Working Function
NAI Network Access Identifier
NAS Non-Access Stratum
NEF Network Exposure Function
NF Network Function
NG-RAN Next Generation Radio Access Network
NR New Radio
NRF Network Repository Function
NSI ID Network Slice Instance Identifier
NSSAI Network Slice Selection Assistance Information
NSSF Network Slice Selection Function
NSSP Network Slice Selection Policy
PCF Policy Control Function
PEI Permanent Equipment Identifier
PER Packet Error Rate
PFD Packet Flow Description
PLMN Public land mobile network
PPD Paging Policy Differentiation
PPI Paging Policy Indicator
PSA PDU Session Anchor
QFI QoS Flow Identifier
QoE Quality of Experience
(R)AN (Radio) Access Network
RLC Radio Link Control
RM Registration Management
RQA Reflective QoS Attribute
RQI Reflective QoS Indication
RRC Radio Resource Control
SA NR Standalone New Radio
SBA Service Based Architecture
SBI Service Based Interface
SD Slice Differentiator
SDAP Service Data Adaptation Protocol
SEAF Security Anchor Functionality
SEPP Security Edge Protection Proxy
SMF Session Management Function
S-NSSAI Single Network Slice Selection Assistance Information
SSC Session and Service Continuity
SST Slice/Service Type
SUCI Subscription Concealed Identifier
SUPI Subscription Permanent Identifier UDSF Unstructured Data Storage Function
UL Uplink
UL CL Uplink Classifier
UPF User Plane Function
UDR Unified Data Repository
URSP UE Route Selection Policy
VPLMN Visited Public land mobile network
SMS Short Message Service
SMSF SMS Function
MT Mobile Terminated
UAC Unified Access Control
ODACD Operator Defined Access Category Definitions
OS Operating System Definitions For the purposes of the present document, the terms and definitions given in 3GPP TR 21.905 [1] and the following apply. A term defined in the present document takes precedence over the definition of the same term, if any, in 3GPP TR 21.905 [1].

CITATION LIST

Non Patent Literature

[NPL 1]
3GPP TR 21.905: "Vocabulary for 3GPP Specifications". V15.0.0 (2018-03)
[NPL 2]
3GPP TS 23.501: "System Architecture for the 5G System; Stage 2". V15.2.0 (2018-06)
[NPL 3]
3GPP TS 23.502: "Procedures for the 5G System; Stage 2" V15.2.0 (2018-06)
[NPL 4]
3GPP TS 24.501: "Non-Access-Stratum (NAS) protocol Stage 3" V15.0.0 (2018-06)

Although the present disclosure has been described above with reference to the some aspects, the present disclosure is not limited to the aspects. The configurations and details of the present disclosure can be changed in various manners that can be understood by one skilled in the art within the scope of the present disclosure.

This application is based upon and claims the benefit of priority from European patent application No. 18197014.6, filed on Sep. 26, 2018, the disclosure of which is incorporated herein in its entirely by reference.

REFERENCE SIGNS LIST

1 TELECOMMUNICATION SYSTEM
3 MOBILE DEVICE
5 BASE STATION
7 CORE NETWORK
10 CPF
11 UPF
12 AF
13 OAM
20 EXTERNAL IP NETWORK
30 UE
310 ANTENNA
320 TRANSCEIVER CIRCUIT
330 CONTROLLER
340 MEMORY
341 OPERATING SYSTEM
342 COMMUNICATION CONTROL MODULE
343 TRANSCEIVER CONTROL MODULE
350 USER INTERFACE
71 AMF
711 TRANSCEIVER CIRCUIT
721 CONTROLLER
735 MEMORY
736 OPERATING SYSTEM
737 COMMUNICATION CONTROL MODULE
738 TRANSCEIVER CONTROL MODULE
741 NETWORK INTERFACE
72 NWDAF
73 V-NWDAF
74 H-NWDAF
75 UDM/UDR
76 NEF
50 (R)AN NODE
510 ANTENNA
520 TRANSCEIVER CIRCUIT
530 CONTROLLER
540 MEMORY
541 OPERATING SYSTEM
542 COMMUNICATION CONTROL MODULE
543 TRANSCEIVER CONTROL MODULE
550 NETWORK INTERFACE
70 CORE NETWORK NODES
710 TRANSCEIVER CIRCUIT
720 CONTROLLER
730 MEMORY
731 OPERATING SYSTEM
732 COMMUNICATION CONTROL MODULE
733 TRANSCEIVER CONTROL MODULE
740 NETWORK INTERFACE

The invention claimed is:

1. A Network Data Analytics Function (NWDAF) node comprising:
   a memory storing instructions; and
   at least one processor configured to process the instructions to execute operations comprising:
      collecting information indicating a number of ping-pong cell re-selections between neighbor cells by a User Equipment (UE);
      determining an abnormal UE behavior based on whether the collected information within a first period reached a threshold; and
      notifying another network node of matching the collected information with an exception based on the determining.

2. The NWDAF node according to claim 1, wherein the notifying causes an Access and Mobility Function (AMF) node to adjust a UE registration area to solve the exception.

3. The NWDAF node according to claim 1, wherein the notifying causes an Access and Mobility Function (AMF) node to adjust a UE registration area in size and shape to UE mobility.

4. The NWDAF node according to claim 1, wherein the notifying causes a Service Provider to adjust a UE location to solve the exception.

5. The NWDAF node according to claim 1, wherein the exception includes "ping-ponging UE".

6. An Access and Mobility Function (AMF) node, comprising:
   a memory storing instructions; and
   at least one processor configured to process the instructions to execute operations comprising:
      transmitting first information indicating a number of ping-pong cell re-selections between neighbor cells within a first period by a User Equipment (UE); and receiving, from a Network Data Analytics Function (NWDAF) node, second information indicating matching the first information with an exception, wherein the second information causes the AMF node to take actions for solving the exception.

7. The AMF node according to claim 6, wherein the actions comprise adjusting a UE registration area to solve the exception.

8. The AMF node according to claim 6, wherein the actions comprise adjusting a UE registration area in size and shape to UE mobility.

9. A control method for a Network Data Analytics Function (NWDAF) node, the control method comprising:

collecting information indicating a number of ping-pong cell re-selections between neighbor cells within a first period by a User Equipment (UE);

determining an abnormal UE behavior based on whether the collected information reached a threshold; and notifying another network node of matching the collected information with an exception based on the determining.

10. The control method according to claim 9, wherein the notifying causes an Access and Mobility Function (AMF) node to adjust a UE registration area to solve the exception.

11. The control method according to claim 9, wherein the notifying causes an Access and Mobility Function (AMF) node to adjust a UE registration area in size and shape to UE mobility.

12. The control method according to claim 9, wherein the notifying causes a Service Provider to adjust a UE location to solve the exception.

13. The control method according to claim 9, wherein the exception includes "ping-ponging UE".

14. A control method for an Access and Mobility Function (AMF) node, the control method comprising:

transmitting first information indicating a number of ping-pong cell re-selections between neighbor cells within a first period by a User Equipment (UE); and receiving, from a Network Data Analytics Function (NWDAF) node, second information indicating matching the first information with an exception, wherein the second information causes the AMF node to take actions for solving the exception.

15. The control method according to claim 14, wherein the actions comprise adjusting a UE registration area to solve the exception.

16. The control method according to claim 14, wherein the actions comprise adjusting a UE registration area in size and shape to UE mobility.

* * * * *